(12) United States Patent
Dietz et al.

(10) Patent No.: US 8,277,765 B2
(45) Date of Patent: Oct. 2, 2012

(54) PROCESS FOR RECOVERING MOLYBDATE OR TUNGSTATE FROM AQUEOUS SOLUTIONS

(75) Inventors: Thomas Dietz, Haibach (DE); Hans Ulrich Süss, Hasselroth (DE)

(73) Assignee: Evonik Degussa GmbH, Essen (DE)

( * ) Notice: Subject to any disclaimer, the term of this patent is extended or adjusted under 35 U.S.C. 154(b) by 452 days.

(21) Appl. No.: 12/431,208

(22) Filed: Apr. 28, 2009

(65) Prior Publication Data

US 2009/0274598 A1 Nov. 5, 2009

Related U.S. Application Data

(60) Provisional application No. 61/136,865, filed on Oct. 9, 2008.

(30) Foreign Application Priority Data

Apr. 30, 2008 (EP) .................................. 08103792
Jul. 31, 2008 (DE) ......................... 10 2008 040 884

(51) Int. Cl.
*B01D 11/00* (2006.01)
(52) U.S. Cl. ....................................................... 423/54
(58) Field of Classification Search .................... 423/54
See application file for complete search history.

(56) References Cited

U.S. PATENT DOCUMENTS

| | | | |
|---|---|---|---|
| 3,835,001 A * | 9/1974 | O'Brien ........................ | 205/503 |
| 4,065,475 A | 12/1977 | Hosoi et al. | |
| 4,401,631 A * | 8/1983 | Canavesi et al. ................ | 423/54 |
| 4,427,490 A | 1/1984 | Eckert | |
| 5,667,694 A | 9/1997 | Cody et al. | |
| 6,048,437 A | 4/2000 | Fukushima et al. | |
| 6,432,266 B1 | 8/2002 | Fukushima et al. | |
| 6,660,128 B1 | 12/2003 | Bourbonnais et al. | |
| 7,250,106 B2 * | 7/2007 | Benazzi et al. ................. | 208/49 |
| 2003/0019596 A1 | 1/2003 | Ragauskas et al. | |
| 2007/0079944 A1 | 4/2007 | Amidon et al. | |

FOREIGN PATENT DOCUMENTS

| | | | |
|---|---|---|---|
| CA | 1129161 | * | 8/1982 |
| CZ | 279 703 | | 6/1995 |
| DE | 44 46 122 A1 | | 6/1996 |
| DE | 4446122 | * | 6/1996 |
| EP | 0 765 842 A1 | | 4/1997 |
| FR | 2 320 946 | | 3/1977 |
| GB | 2 065 628 A | | 7/1981 |
| JP | 60220135 | * | 11/1985 |
| JP | 61-261215 | | 11/1986 |
| JP | 6-10089 | | 1/1994 |
| JP | 11-130762 | | 5/1999 |
| JP | 2003-48716 | | 2/2003 |
| RU | 2 176 677 C2 | | 12/2001 |
| SU | 1836465 A3 | | 8/1993 |
| WO | WO 96/01921 | | 1/1996 |
| WO | WO 96/37654 | | 11/1996 |

OTHER PUBLICATIONS

Kubelka et al, J Pulp & Paper Sc, 18, 3, 1992, J108-J114.*
Atia, App Clay Sc, 41, 2008, 73-84.*
Atia, Adsorption of chromate and molybdate by cetylpyridinium bentonite, Applied Clay Science, 41 (2008), 73-78.*
European Search Report for EP 08 10 3792.
Kubelka, et al., "Delignification with Acidic Hydrogen Peroxide Activated by Molybdate," *Journal of Pulp Paper and Science* 18(3):J108-J114 (May 1992).
Sameer, et al., In the proceedings of the 93$^{rd}$ annual conference of the PATPTAC, pp. A261-A268 (2007).
English language abstract for CZ 279 703 listed as document B1 above.
English language abstract for DE 44 46 122 listed as document B2 above.
English language abstract for FR 2 320 946 listed as document B4 above.
English language abstract for JP 61-261215 listed as document B6 above.
English language abstract for JP 6-10089 listed as document B7 above.
English language abstract for JP 11-130762 listed as document B8 above.
English language abstract for JP 2003-48716 listed as document B9 above.
English language abstract for SU 1836465 listed as document B10 above.
International Search Report for PCT/EP2009/055035 filed Apr. 27, 2009.
Written Opinion of the International Searching Authority PCT/EP2009/055035 filed Apr. 27, 2009.
Database WPI Week 200165; Thomson Scientific, London, GB; AN 2001-577936; XP002540018.
English Translation of International Search Report for PCT/EP2009/055035 filed Apr. 27, 2009.
Certified English Translation of DE 4446122.
Manning, et al., "Addition of Hydrogen Peroxide and Molybdate to Chlorine Dioxide Bleaching Stages," *Journal of Pulp Paper and Science* 32(2):58-62 (2006).
U.S. Appl. No. 13/007,664, filed Jan. 16, 2011, Dietz.

* cited by examiner

*Primary Examiner* — Melvin C Mayes
*Assistant Examiner* — Bijay Saha
(74) *Attorney, Agent, or Firm* — Law Office of: Michael A. Sanzo, LLC

(57) ABSTRACT

Process for recovering molybdate or tungstate from an aqueous solution, in which molybdate or tungstate is bound to a water-insoluble, cationized inorganic carrier material from the aqueous solution at a pH in the range from 2 to 6, the laden carrier material is separated off and the bound molybdate or tungstate is liberated once again into aqueous solution at a pH in the range from 6 to 14. The process is suitable for recovering molybdate or tungstate in the delignification of pulp with hydrogen peroxide in the presence of molybdate or tungstate as catalyst. The recovered molybdate or tungstate can be recycled to the delignification.

15 Claims, No Drawings

PROCESS FOR RECOVERING MOLYBDATE OR TUNGSTATE FROM AQUEOUS SOLUTIONS

CROSS REFERENCE TO RELATED APPLICATIONS

The present application claims priority to, and the benefit of, U.S. provisional application 61/136,865 filed on Oct. 9, 2008, German Application (DE) 102008040884.0, filed on Jul. 31, 2008 and European application (EP) 08103792.1, filed on Apr. 30, 2008. The contents of these prior applications are hereby incorporated by reference in their entirety.

FIELD OF THE INVENTION

The invention relates to a process for recovering molybdate or tungstate from aqueous solutions, which is particularly suitable for recovering molybdate or tungstate in the molybdate- or tungstate-catalyzed delignification of pulp by means of hydrogen peroxide.

BACKGROUND OF THE INVENTION

Pulp bleaching is usually carried out using hydrogen peroxide in an alkaline medium, since free-radicals are formed in an acidic medium at elevated temperature and these lead to undesirable secondary reactions such as degradation of cellulose. However, if a suitable catalyst is used, delignification and bleaching by means of hydrogen peroxide is also possible under acidic conditions.

U.S. Pat. No. 4,427,490 describes the delignification and bleaching of kraft pulp by means of hydrogen peroxide in an acidic medium, catalyzed by sodium tungstate or sodium molybdate.

In Journal of Pulp and Paper Science, Vol. 18, 1992, pages J108-J114, V. Kubelka describes a process for the delignification of pulp which has steps for delignification by means of oxygen and an intermediate delignification by means of hydrogen peroxide, which is carried out at a pH of 5 using sodium molybdate as catalyst. In the article, it is proposed that molybdate be recovered in a known manner using anion exchangers.

JP 11 130 762 describes the recovery of tungstate from a reaction mixture from the tungstate-catalyzed oxidation of maleic anhydride with aqueous hydrogen peroxide. The reaction mixture is for this purpose passed over a chelating resin having glucamine substituents and the resin is subsequently washed with aqueous sulphuric acid. The tungstate is then washed out of the chelating resin using aqueous sodium hydroxide. FR 2 320 946 describes the recovery of tungstate from the same reaction mixture with a strong-base anion-exchange resin.

JP 2003048716 describes a recovery of molybdate using a chelating ion-exchange resin.

CZ 279 703 describes a multistage recovery process for molybdate, in which molybdate is firstly adsorbed on a weak-base styrene-divinylbenzene ion exchanger and the molybdate is liberated in a subsequent step with aqueous ammonia.

JP 06010089 B proposes a chelating resin containing dithiocarboxyl groups for the recovery of molybdate.

However, the recovery of molybdate or tungstate using ion-exchange columns is too complicated and uneconomical for use in pulp bleaching because of the steps required for flushing of the ion exchangers. In addition, the degradation products of lignin formed in the delignification of pulp are adsorbed on the ion-exchange resins used in the prior art, which has an adverse effect on the ion-exchange properties of the ion-exchange resin.

In the proceedings of the 93$^{rd}$ annual conference of the PATPTAC 2007, pages A261-A268, R. C. Francis et al. propose precipitation of the molybdate catalyst in the catalyzed delignification of pulp by addition of the cationic surfactant cetyltrimethylammonium bromide and filtering off the complex formed. The molybdate is recovered from the filtered off complex by dissolution in sodium hydroxide solution and extraction of the cationic surfactant with a solvent such as isobutanol. However, the process proposed has the disadvantage that the complex formed from molybdate with cetyltrimethylammonium bromide is difficult to filter and the use of an additional organic solvent is necessary for recovery of molybdate.

For this reason, there continues to be a need for a process which is simple to carry out and whereby molybdate or tungstate can be recovered from an aqueous solution to a high degree, with the process being suitable for recovering molybdate or tungstate from the aqueous solutions obtained in the delignification of pulp.

DESCRIPTION OF THE INVENTION

It has now surprisingly been found that this object can be achieved by the use of a water-insoluble, cationized inorganic carrier material. The carrier material according to the invention binds molybdate or tungstate from aqueous solutions at a pH in the range from 2 to 6 and liberates the bound molybdate or tungstate again in aqueous solution at a pH in the range from 6 to 14. The carrier material according to the invention can also be separated off from the aqueous solution in a simple manner in both pH ranges by sedimentation, filtration or centrifugation.

The invention accordingly provides a process for recovering molybdate or tungstate from an aqueous solution, which comprises the following steps:

a) contacting a molybdate- or tungstate-containing aqueous solution with a water-insoluble, cationized inorganic carrier material at a pH in the range from 2 to 6 to give a carrier material laden with molybdate or tungstate and an aqueous solution depleted in molybdate or tungstate, b) separating the carrier material laden with molybdate or tungstate from the aqueous solution depleted in molybdate or tungstate, c) contacting the carrier material laden with molybdate or tungstate with an aqueous solution at a pH in the range from 6 to 14 to give a carrier material depleted in molybdate or tungstate and an aqueous solution laden with molybdate or tungstate, and d) separating the carrier material depleted in molybdate or tungstate from the aqueous solution laden with molybdate or tungstate.

For the purposes of the present invention, the terms molybdate and tungstate encompass both mononuclear molybdates and tungstates, e.g. $MoO_4^{2-}$ or $WO_4^{2-}$, and also polynuclear molybdates and tungstates, e.g. $Mo_7O_{24}^{6-}$, $Mo_8O_{26}^{4-}$, $HW_6O_{21}^{5-}$, $W_{12}O_{41}^{10-}$ or $W_{12}O_{39}^{6-}$, and heteroatom-containing polynuclear molybdates and tungstates, e.g. $PMo_{12}O_{40}^{3-}$, $SiMo_{12}O_{40}^{3-}$, $PW_{12}O_{40}^{3-}$ or $SiW_{12}O_{40}^{3-}$.

In step a) of the process of the invention, the molybdate- or tungstate-containing aqueous solution is brought into contact with the water-insoluble, cationized inorganic carrier material at a pH in the range from 2 to 6, preferably in the range from 3 to 5, particularly preferably in the range from 3.5 to 4. The setting of a pH in this range makes it possible to achieve virtually complete recovery of molybdate or tungstate from the aqueous solution with a low consumption of agents for regulating the pH. During contacting, the water-insoluble, cationized inorganic carrier material is preferably dispersed in the molybdate- or tungstate-containing aqueous solution by means of a stirrer or a disperser. Contacting can be carried out at any temperature; temperatures in the range from 0 to 100° C. are suitable.

In step a), the cationized inorganic carrier material is preferably used in an amount of from 10 to 1000 parts by weight of carrier material per part by weight of molybdenum or in an amount of from 200 to 10 000 parts by weight of carrier material per part by weight of tungsten in the contacting with the molybdate- or tungstate-containing aqueous solution. To recover molybdate, particular preference is given to using from 50 to 500 parts by weight and in particular from 100 to 300 parts by weight of carrier material per part by weight of molybdenum. To recover tungstate, particular preference is given to using from 1000 to 5000 parts by weight and in particular from 2000 to 3000 parts by weight of carrier material per part by weight of molybdenum.

In step b) of the process of the invention, the carrier material laden with molybdate or tungstate is separated from the aqueous solution depleted in molybdate or tungstate. The separation can be carried out using all solid-liquid separation processes known to those skilled in the art, for example by sedimentation, filtration or centrifugation. The carrier material laden with molybdate or tungstate which has been separated off can additionally be washed with water having a pH in the range from 2 to 6 in order to reduce the proportion of adhering organic impurities.

In step c) of the process of the invention, the carrier material laden with molybdate or tungstate which has been separated off in step b) is brought into contact with an aqueous solution at a pH in the range from 6 to 14. In this pH range, molybdate or tungstate is detached once again from the support and a carrier material depleted in molybdate or tungstate and an aqueous solution laden with molybdate or tungstate are obtained. The pH is preferably selected in the range from 8 to 12 and particularly preferably in the range from 9 to 11. Setting of a pH in these ranges makes it possible for molybdate or tungstate to be virtually completely detached from the support with a low consumption of agents for regulating the pH. In the contacting, the carrier material laden with molybdate or tungstate is preferably dispersed in the aqueous solution by means of a stirrer or a disperser. Contacting can be carried out at any temperature; temperatures in the range from 0 to 100° C. are suitable.

In step d) of the process of the invention, the carrier material depleted in molybdate or tungstate is separated from the aqueous solution laden with molybdate or tungstate. The separation can be carried out using all solid-liquid separation processes known to those skilled in the art, for example by sedimentation, filtration or centrifugation. The carrier material depleted in molybdate or tungstate which has been separated off can be additionally washed with an aqueous solution having a pH in the range from 6 to 14 to complete the detachment of molybdate or tungstate from the carrier material. The washing liquid resulting from washing is preferably combined with the aqueous solution laden with molybdate or tungstate.

The carrier material depleted in molybdate or tungstate which has been separated off in step d) can be used again in step a) of the process for recovering molybdate or tungstate.

In the process of the invention, a water-insoluble, cationized inorganic carrier material is used for the separation. Suitable cationized inorganic carrier materials are inorganic carrier materials whose surface has been modified with positively charged functional groups. The modification can be carried out, for example, by reaction of the surface with reagents which covalently anchor a positively charged functional group on the surface. Suitable water-insoluble, cationized inorganic carrier materials having covalently anchored positively charged functional groups are, for example, aminosilane-modified precipitated or pyrogenic silicas, which are preferably additionally quaternized on the amino group. As an alternative, the modification can also be effected by ion exchange of an inorganic carrier material which is negatively charged on the surface with a quaternary ammonium salt. The quaternary ammonium salt used for this purpose preferably has at least one nonpolar alkyl radical having from 6 to 24, particularly preferably from 12 to 22, carbon atoms in order to prevent detachment of the quaternary ammonium ions from the support in acid conditions.

Preference is given to using a cationized sheet silicate, particularly preferably a sheet silicate which has been ion-exchanged with a quaternary ammonium salt, as water-insoluble, cationized inorganic carrier material in the process of the invention. Suitable sheet silicates are kaolins, smectites, illites, bentonites (montmorillonites), hectorites, pyrophillites, attapulgites, sepiolites and laponites, preferably bentonites, hectorites and attapulgites which have been ion-exchanged with a quaternized ammonium salt, particularly preferably bentonite which has been ion-exchanged with a quaternary ammonium salt.

Bentonites, hectorites and attapulgites which have been ion-exchanged with quaternized ammonium salts are commercially available: Quaternium-18 bentonite as Bentone 34 from Rheox Corp. and as Claytone 34, Claytone 40 and Claytone XL from Southern Clay; stearalkonium bentonite as Tixogel LG from United Catalysts, as Bentone SD-2 from Elementis Specialties and as Claytone AF and Claytone APA from Southern Clay; Quaternium-18/benzalkonium bentonite as Claytone GR, Claytone HT and Claytone PS from Southern Clay; Quaternium-18 hectorites as Bentone 38 from Rheox Corp.; dihydrogenated tallow benzylmonium hectorites as Bentone SD-3 from Rheox Corp.; stearalkonium hectorites as Bentone 27 from Rheox Corp.; and also cationized attapulgite as Vistrol 1265 from Cimbar. These ion-exchanged sheet silicates can be used in the process of the invention either as powders or in the form of the commercially available dispersions in an oil or an organic solvent.

Apart from the commercial bentonites, hectorites and attapulgites which have been ion-exchanged with tetraalkylammonium ions, it is also possible to use the corresponding materials which have been ion-exchanged with quaternized alkanolamine fatty acid esters, in particular bentonite which has been ion-exchanged with dimethyldiethanolammonium monoesters and diesters of fatty acids as well as methyltriethanolammonium monoesters, diesters and triesters of fatty acids. Preference is given to using such esters with saturated fatty acids, in particular saturated fatty acids having from 12 to 18 carbon atoms.

In a preferred embodiment of the process of the invention, the water-insoluble, cationized inorganic carrier material is arranged in a fixed bed. Steps a) and b) of the process are then carried out by passing the molybdate- or tungstate-containing aqueous solution through a fixed bed which contains the water-insoluble, cationized inorganic carrier material. While the molybdate- or tungstate-containing aqueous solution is being passed through the fixed bed, the molybdate or tungstate present in the solution is bound to the water-insoluble, cationized inorganic carrier material and the aqueous solution leaving the fixed bed is depleted in molybdate or tungstate.

After loading of the water-insoluble, cationized inorganic carrier material located in the fixed bed, steps c) and d) of the process are carried out by passing an aqueous solution having a pH in the range from 6 to 14 through the fixed bed which has been laden with molybdate or tungstate in steps a) and b). The aqueous solution leaving the fixed bed here contains the major part of the molybdate or tungstate which was bound to the water-insoluble, cationized inorganic carrier material in step a) and the fixed bed can, after carrying out these steps, once again be used for recovering molybdate or tungstate in steps a) and b).

The passage of the molybdate- or tungstate-containing aqueous solution through the fixed bed is preferably stopped before the content of molybdate or tungstate in the aqueous solution leaving the fixed bed rises above the desired residual content.

The fixed bed preferably contains a water-insoluble filler material in addition to the water-insoluble, cationized inorganic carrier material in order to increase the porosity of the fixed bed. Suitable water-insoluble filler materials are filter aids known from the prior art, which can be synthetic or natural, organic or inorganic in nature. A suitable inorganic filter aid is, for example, the silica gel obtainable under the trade name Celite 503 from Merck. A suitable natural organic filter aid is, for example, cellulose which is obtainable under the trade name Jelucel HM 200 from Jelu. Synthetic polymers of which the dewatering mats in the washing presses of pulp and paper machines are made can also be used as water-insoluble filler material. Particular preference is given to using cellulose as water-insoluble filler material. The fixed bed preferably contains the water-insoluble, cationized inorganic carrier material and the water-insoluble filler material in a weight ratio of from 10:1 to 1:100. The fixed bed particularly preferably contains a composition containing a water-insoluble, cationized inorganic carrier material and cellulose in a weight ratio of from 10:1 to 1:100, in particular from 10:1 to 1:10. The use of an additional filler material makes it possible to improve the degree of loading of the water-insoluble, cationized inorganic carrier material with molybdate or tungstate. In addition, the pressure drop during passage of the aqueous solutions through the fixed bed can be reduced and the process can be carried out more rapidly, and malfunctions due to blockage of the fixed bed by impurities can be avoided.

Preference is given to using at least two fixed beds which are connected in parallel and in which the steps a) and b) and the steps c) and d) are carried out alternately, i.e. the recovery of molybdate or tungstate from an aqueous solution is carried out in steps a) and b) in a first fixed bed while the molybdate or tungstate is detached again from the support in steps c) and d) in a second fixed bed which is connected in parallel and has already been laden with molybdate or tungstate. In a particularly preferred embodiment, the fixed beds arranged in parallel are then switched over so that the passage of the molybdate- or tungstate-containing aqueous solution through a fixed bed occurs continuously.

The invention additionally provides a process for recovering molybdate or tungstate in the delignification of pulp, in which the pulp is reacted in an aqueous mixture containing from 0.1 to 5% by weight of hydrogen peroxide and from 10 to 1000 ppm of molybdenum in the form of molybdate or from 200 to 10 000 ppm of tungsten in the form of tungstate, in each case based on the mass of dry pulp, at a temperature of from 30 to 100° C. and a pH in the range from 1 to 7 and the pulp is separated from the aqueous solution, molybdate or tungstate is recovered from the resulting aqueous solution by means of the above-mentioned steps and the aqueous solution laden with molybdate or tungstate which results in the last step is recycled to the delignification of pulp with hydrogen peroxide.

In the delignification of pulp using molybdate or tungstate as catalyst, from 0.1 to 5% by weight, preferably from 0.5 to 4% by weight and particularly preferably from 1 to 3% by weight, of hydrogen peroxide, based on the mass of dry pulp, is used. When molybdate is used as catalyst, the molybdate is used in an amount of from 10 to 1000 ppm, preferably from 100 to 700 ppm and particularly preferably from 200 to 600 ppm, of molybdenum, based on the mass of dry pulp. When tungstate is used as catalyst, the tungstate is used in an amount of from 200 to 10 000 ppm, preferably from 500 to 5000 ppm and particularly preferably from 1500 to 3000 ppm, of tungsten, based on the mass of dry pulp. An effective delignification and bleaching of the pulp is achieved and a pulp having a reduced tendency to undergo yellowing is obtained by choosing the amounts of hydrogen peroxide and molybdate or tungstate in these ranges.

The delignification of pulp using molybdate or tungstate as catalyst is carried out at a temperature of from 30 to 100° C., preferably from 60 to 95° C. and particularly preferably from 75 to 95° C., with the pH being selected in the range from 1 to 7, preferably from 2 to 6 and particularly preferably from 2.5 to 5.5. The choice of reaction conditions effects rapid and effective delignification and bleaching of the pulp. In addition, the delignification with addition of molybdate or tungstate can be combined with further process steps for delignification and/or bleaching under these reaction conditions with only a small additional input of energy and/or chemicals for adjusting temperature and/or pH.

The following examples illustrate the claimed process but without restricting the scope of the invention.

EXAMPLES

Example 1 (Comparative Example)

Delignification of Pulp Using Hydrogen Peroxide without Addition of Molybdate 761 g of eucalyptus pulp, corresponding to 200 g of absolutely dry pulp, having a kappa number of 10.3, a brightness of 57.0% ISO and a yellow value of 22.1, were brought to a consistency of 10% by weight with water and 1.0% by weight of hydrogen peroxide (based on absolutely dry pulp) and the pH was adjusted to 2.7 with sulphuric acid. The mixture was heated at 90° C. in a plastic bag in a waterbath for 120 minutes. Water was then added so as to give a suspension having a consistency of 2% by weight, and the pulp was filtered off on a suction filter using filter paper. The pulp which had been treated in this way had a kappa number of 5.4, a brightness of 60.2% ISO and a yellow value of 22.6. The filtrate obtained had a pH of 3.0. A hydrogen peroxide conversion of 59% was calculated from the residual peroxide content of the filtrate.

Example 2

Delignification of Pulp Using Hydrogen Peroxide with Molybdate Recovery Using Cationized Sheet Silicate Example 1 was repeated but sodium molybdate was additionally added in an amount of 500 ppm of molybdenum, based on absolutely dry pulp, to the mixture of pulp, water and hydrogen peroxide before heating. The treated pulp had a kappa number of 3.5, a brightness of 61.5% ISO and a yellow value of 19.8. The filtrate obtained had a pH of 3.0. A hydrogen peroxide conversion of 79% was calculated from the residual peroxide content of the filtrate. The filtrate contained 9.8 ppm of molybdenum, which corresponded to 98% of the amount used.

The pH of the filtrate was adjusted to 3.7 with a 10% by weight sodium hydroxide solution. 0.2% by weight (based on the weight of the filtrate) of cationically modified bentonite BENTONE® SD-2 (Elementis Specialties) was then added and dispersed by means of a dispersing stirrer provided with a perforated disc (Pendraulik model LD50) at a rotational speed of about 1000 min$^{-1}$ for 15 minutes. The pH was once again adjusted to 3.7 with a 10% by weight sodium hydroxide solution and the dispersion was filtered on a suction filter using filter paper. The molybdenum content in the filtrate was 0.46 ppm, which corresponds to a removal of molybdenum by the bentonite of 95%.

The bentonite filtercake was sucked dry and stirred into water, whose pH had been adjusted to 10 with a 10% by weight sodium hydroxide solution, at a consistency of 5% using a magnetic stirrer at 50° C. for 30 minutes. The pH was once again adjusted to 10 with a 10% by weight sodium hydroxide solution, the mixture was filtered on a suction filter using filter paper and the filtercake was washed twice using, in each case, 20% of the filtrate volume of water which had a temperature of 50° C. and whose pH had been adjusted to 10 with sodium hydroxide solution. The filtrate obtained contained 91% of the amount of molybdate used for the treatment of the pulp.

Example 3

Delignification of Pulp Using Recovered Molybdate

Example 2 was repeated using an amount of 228 g of eucalyptus pulp, corresponding to 60 g of absolutely dry material. However, the filtrate obtained at the end of Example 2 was used instead of sodium molybdate for producing the mixture of pulp, water, hydrogen peroxide and molybdate. Instead of fresh bentonite BENTONE® SD-2, the corresponding amount of the bentonite filtercake obtained at the end of Example 2 was used.

The treated pulp had a kappa number of 2.9, a brightness of 62.2% ISO and a yellow value of 19.1. The filtrate obtained after the treatment of the pulp had a pH of 3.0. A hydrogen peroxide conversion of 81% was calculated from the residual peroxide content of the filtrate. The filtrate contained 9.8 ppm of molybdenum, which corresponded to 98% of the amount used. After the treatment of the filtrate with the bentonite at pH 3.7, the molybdenum content in the filtrate was 0.54 ppm, which corresponds to a removal of molybdenum by the bentonite of 94%. The filtrate obtained in the subsequent treatment of the bentonite with water of a pH of 10 contained 90% of the amount of molybdate used for the treatment of the pulp.

Example 4 (Comparative Example)

Delignification of Pulp Using Hydrogen Peroxide and Molybdate Recovery Using Ion-exchange Resin Example 2 was repeated using eucalyptus pulp having a kappa number of 12.0, a brightness of 52.3% ISO and a yellow value of 29.9. The filtrate obtained after the delignification of the pulp contained 8.2 ppm of molybdenum. To recover the molybdate, the same amount of anion-exchange resin DOWEX M-43 was added in place of the cationic sheet silicate and the mixture was stirred for 60 minutes using a magnetic stirrer in place of the dispersing stirrer. The molybdenum content in the filtrate from the molybdate recovery was 2.0 ppm, which corresponds to a removal of molybdenum by the anion-exchange resin of 76%.

Compared to Example 2, Example 4 shows that the separation of molybdate from the filtrate of the delignification of pulp using the cationized sheet silicate is more complete than when using the anion-exchange resin.

Example 5

Recovery of Molybdate Using Different Sheet Silicates

Aqueous solutions of sodium molybdate which had a molybdenum content of 30 ppm and had been adjusted to a pH of 3.7 using sulphuric acid were in each case admixed with 0.2% by weight (based on the weight of the solution) of sheet silicate and the sheet silicate was dispersed using a dispersing stirrer provided with a perforated disc (Pendraulik model LD50) at a rotational speed of about 1000 min$^{-1}$ for 15 minutes. The pH was once again adjusted to 3.7 with a 10% by weight sodium hydroxide solution and the dispersion was filtered on a suction filter using filter paper. In the case of the sheet silicate Syntal® 696, the pH had to be adjusted by addition of sulphuric acid. Table 1 shows the sheet silicates examined, the molybdenum content of the filtrate and the filterability of the sheet silicate laden with molybdate.

The results in Table 1 show that the molybdate can be recovered more completely and, owing to the improved filterability, more simply using the cationized sheet silicate than when using an uncationized sheet silicate.

Example 6 (Comparative Example)

Recovery of Molybdate Using Various Ion-exchange Resins

Example 5 was repeated using an ion-exchange resin in place of a sheet silicate and a magnetic stirrer in place of the dispersing stirrer. Table 2 shows the ion-exchange resins examined, the content of molybdenum in the filtrate and the filterability of the ion-exchange resin laden with molybdate.

Compared to the results in Table 1, the results in Table 2 show that the molybdate can be recovered more completely using the cationized sheet silicate than when using an ion-exchange resin.

TABLE 1

Recovery of molybdate using different sheet silicates

| Sheet silicate | Molybdenum content in the filtrate in ppm | Filterability |
|---|---|---|
| Bentone ® SD-2 (cationized bentonite, Elementis Specialties) | less than 1 | readily filterable |
| EX M 1694 * (acid-activated Ca bentonite, Süd-Chemie) | 24 | readily filterable |
| Bentone ® HC * (purified hectorite, Elementis Specialties) | not determined | not filterable |
| Syntal ® 696 * (basic Mg—Al carbonate, Süd-Chemie) | 5.6 | difficult to filter |

* not according to the invention

TABLE 2

Recovery of molybdate using various ion-exchange resins

| Ion-exchange resin | Molybdenum content in the filtrate in ppm | Filterability |
|---|---|---|
| DOWEX ® M-43 (weakly basic anion-exchange resin, Dow chemical) | 7.9 | readily filterable |
| DOWEX ® PSR-3 (strongly basic anion-exchange resin, Dow chemical) | 14.6 | readily filterable |
| DOWEX ® NSR-1 (strongly basic anion-exchange resin, Dow chemical) | 13.4 | readily filterable |
| DOWEX ® MARA MSA (strongly basic anion-exchange resin, Dow chemical) | 13.9 | readily filterable |

Example 7

Recovery of Molybdate Using a Fixed Bed of Cationized Bentonite 2 g of cationically modified bentonite BENTONE® SD-2 (Elementis Specialties) were suspended in 40 ml of water and filtered off on a suction filter having a diameter of 4.5 cm and provided with a paper filter having a pore size of 12-25 µm. The filter cake obtained had a height of about 5 mm and was used as fixed bed for the recovery of molybdate. For this purpose, 500 ml of a solution, which had been obtained in the delignification of pulp and contained a silicomolybdate in an amount of 12.9 ppm of Mo, was drawn through the filter cake by suction at room temperature in portions of 100 ml each and the concentration of Mo in the portions obtained was subsequently determined using Merckoquant® molybdenum test strips. The first two portions contained molybdate in an amount of less than 1 ppm of Mo, the next two portions contained less than 5 ppm of Mo and only the last portion contained molybdate in an amount of more than 5 ppm of Mo. Three portions of 20 ml each of a 0.5% by weight sodium hydroxide solution were subsequently drawn through the filter cake by suction and the filtrates obtained were combined. The combined filtrates contained molybdate in an amount of more than 50 ppm of Mo, i.e. more than 65% of the molybdenum present in the solution obtained in the delignification of pulp.

Example 8

Recovery of Molybdate Using a Fixed Bed of Cationized Bentonite and a Filler Material Example 7 was repeated with the difference that, to produce the fixed bed, first a suspension of 1.27 g of Celite® 503 (Merck) in 10 ml of water and subsequently a suspension of 2 g of Celite® 503 and 2 g of BENTONE® SD-2 in 40 ml of water were drawn with suction through the same suction filter. The same recovery of molybdate was achieved.

Example 9

Recovery of Molybdate Using a Fixed Bed of Cationized Bentonite and a Filler Material Example 7 was repeated with the difference that, to produce the fixed bed, a suspension of 1 g of beech sulphite pulp, 1 g of Celite® 503 and 2 g of BENTONE® SD-2 in 80 ml of water were drawn with suction through the suction filter and three portions of 50 ml each of a 0.5% by weight sodium hydroxide solution were used in place of three portions of 20 ml each of a 0.5% by weight sodium hydroxide solution. The same recovery of molybdate was achieved.

Example 10

Recovery of Molybdate Using a Fixed Bed of Cationized Bentonite and Pulp 10 g of beech sulphite pulp and 5 g of cationically modified bentonite BENTONE® SD-2 (Elementis Specialties) were dispersed in 500 ml of water with a dispersing stirrer having a perforated disc (Pendraulik model LD50) at a rotational speed of about 1500 min$^{-1}$ for 1 minute and the dispersion obtained was filtered with suction on a suction filter having a diameter of 7 cm and provided with a paper filter having a pore size of 12-25 µm. The filter cake obtained was used as fixed bed for the recovery of molybdate. For this purpose, a solution which had been obtained in the delignification of pulp and contained a silicomolybdate in an amount of 12.9 ppm of Mo was drawn through the filter cake by suction in portions of 100 ml each and the concentration of Mo in the portions obtained was subsequently determined using Merckoquant® molybdenum test strips. The first 7 portions contained molybdate in an amount of less than 1 ppm of Mo, the next 4 portions contained less than 5 ppm of Mo and only the last portion contained molybdate in an amount of more than 5 ppm of Mo. Three portions of 50 ml each of a 0.5% by weight sodium hydroxide solution and then 50 ml of water were subsequently drawn through the filter cake by suction and the filtrates obtained were combined. The combined filtrates contained molybdate in an amount of more than 50 ppm of Mo, i.e. more than 75% of the molybdenum present in the solution obtained in the delignification of pulp.

What is claimed:

1. A process for recovering molybdate or tungstate from an aqueous solution, comprising the steps:
    a) contacting an aqueous solution containing molybdate or tungstate with a water-insoluble, cationized inorganic carrier material at a pH in the range from 2 to 6 to give a carrier material laden with molybdate or tungstate and an aqueous solution depleted in molybdate or tungstate,
    b) separating said carrier material laden with molybdate or tungstate from said aqueous solution depleted in molybdate or tungstate,
    c) contacting said carrier material laden with molybdate or tungstate with an aqueous solution at a pH in the range from 6 to 14 to give a carrier material depleted in molybdate or tungstate and an aqueous solution laden with molybdate or tungstate, and
    d) separating said carrier material depleted in molybdate or tungstate from said aqueous solution laden with molybdate or tungstate;
wherein said cationized inorganic carrier material is a cationized sheet silicate selected from the group consisting of bentonites, hectorites and attapulgites and said sheet silicate has been ion-exchanged with a quaternary tetraalkylammonium salt or with a quaternized alkanolamine fatty acids ester.

2. The process of claim 1, wherein the pH in step a) is in the range from 3 to 5.

3. The process of claim 1, wherein the pH in step c) is in the range from 8 to 12.

4. The process of claim 1, wherein the cationized inorganic carrier material is a cationized sheet silicate.

5. The process of claim 4, wherein the cationized sheet silicate is a bentonite which has been ion-exchanged with a quaternary ammonium salt.

6. The process of claim 1, wherein the cationized inorganic carrier material is used in an amount of from 10 to 1000 parts by weight of carrier material per part by weight of molybdenum or in an amount of from 200 to 10 000 parts by weight of carrier material per part by weight of tungsten in the contacting with an aqueous solution containing molybdate or tungstate in step a).

7. The process of claim 6, wherein the cationized inorganic carrier material is used in an amount of from 50 to 500 parts by weight of carrier material per part by weight of molybdenum.

8. The process of claim 6, wherein the cationized inorganic carrier material is used in an amount of from 1000 to 5000 parts by weight of carrier material per part by weight of tungsten.

9. The process of claim 1, wherein steps a) and b) are carried out by passing the aqueous solution containing molybdate or tungstate through a fixed bed comprising the water-insoluble, cationized inorganic carrier material and steps c) and d) are carried out by passing an aqueous solution having a pH in the range from 6 to 14 through the fixed bed which has been laden with molybdate or tungstate in steps a) and b).

10. The process of claim 9, wherein the fixed bed comprises a water-insoluble filler material in addition to the water-insoluble, cationized inorganic carrier material.

11. The process of claim 10, wherein cellulose is used as water-insoluble filler material.

12. The process of claim 10, wherein the water-insoluble, cationized inorganic carrier material and the water-insoluble filler material are used in a weight ratio of from 10:1 to 1:100.

13. The process of claim 9, wherein at least two fixed beds connected in parallel are used, in which steps a) and b) and steps c) and d) are carried out alternately.

14. The process of claim 13, wherein the passing of the aqueous solution containing molybdate or tungstate through a fixed bed is carried out continuously by switching over between fixed beds connected in parallel.

15. The process of claim 1, wherein said carrier material depleted in molybdate separated off in step d) is used again in step a).

* * * * *